United States Patent
Yu et al.

(10) Patent No.: US 10,616,636 B2
(45) Date of Patent: Apr. 7, 2020

(54) SETTING INTEGRATED REMOTE CONTROLLER OF DISPLAY DEVICE

(71) Applicant: LG ELECTRONICS INC., Seoul (KR)

(72) Inventors: Seonil Yu, Seoul (KR); Obong An, Seoul (KR); Gahyun Chloe Sun, Seoul (KR); Kwangseob Jeong, Seoul (KR); Jaesung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/754,913

(22) PCT Filed: Jun. 2, 2016

(86) PCT No.: PCT/KR2016/005863
§ 371 (c)(1),
(2) Date: Feb. 23, 2018

(87) PCT Pub. No.: WO2017/034130
PCT Pub. Date: Mar. 2, 2017

(65) Prior Publication Data
US 2018/0270525 A1 Sep. 20, 2018

(30) Foreign Application Priority Data
Aug. 25, 2015 (KR) .......................... 10-2015-0119812

(51) Int. Cl.
*H04N 21/422* (2011.01)
*H04N 21/436* (2011.01)
(Continued)

(52) U.S. Cl.
CPC ..... *H04N 21/42204* (2013.01); *H04N 5/4403* (2013.01); *H04N 21/422* (2013.01);
(Continued)

(58) Field of Classification Search
CPC .......... H04N 21/42204; H04N 21/422; H04N 5/4403; H04N 21/472; H04N 21/436; H04Q 9/02; G08C 2201/21; G08C 2201/92
See application file for complete search history.

(56) References Cited

U.S. PATENT DOCUMENTS 5,715,020 A * 2/1998 Kuroiwa ................ H04B 1/202
348/734
6,344,817 B1 * 2/2002 Verzulli ................. G08C 19/28
340/12.28
(Continued)

FOREIGN PATENT DOCUMENTS

EP 2645728 A1 10/2013
EP 2701394 A1 2/2014
(Continued)

*Primary Examiner* — Jefferey F Harold
*Assistant Examiner* — Human M Satti
(74) *Attorney, Agent, or Firm* — Birch, Stewart, Kolasch & Birch, LLP

(57) ABSTRACT

A method for setting an integrated remote control of a display device, according to an embodiment of the present invention, comprises the steps of: displaying a first image outputted from an external device connected to the display device; confirming a service providing company of the external device by using information included in the displayed first image; acquiring a remote control model, among a plurality of remote control models provided from the confirmed service providing company, for controlling the external device; and transmitting a key code set of the acquired remote control model to a remote control device.

12 Claims, 10 Drawing Sheets

(51) Int. Cl.
    *H04N 21/472* (2011.01)
    *H04Q 9/02* (2006.01)
    *H04N 5/44* (2011.01)
(52) U.S. Cl.
    CPC ......... *H04N 21/436* (2013.01); *H04N 21/472* (2013.01); *H04Q 9/02* (2013.01); *G08C 2201/21* (2013.01); *G08C 2201/92* (2013.01)

(56) References Cited

U.S. PATENT DOCUMENTS

| | | | | |
|---|---|---|---|---|
| 6,909,378 | B1 * | 6/2005 | Lambrechts | G06F 3/0238 |
| | | | | 340/12.25 |
| 7,436,319 | B1 * | 10/2008 | Harris | G08C 17/02 |
| | | | | 340/12.24 |
| 7,589,642 | B1 * | 9/2009 | Mui | G08C 17/00 |
| | | | | 340/12.3 |
| 8,234,629 | B2 * | 7/2012 | Barajas | H04L 12/2814 |
| | | | | 717/121 |
| 8,918,544 | B2 * | 12/2014 | Chardon | H04N 5/44 |
| | | | | 710/15 |
| 10,448,104 | B1 * | 10/2019 | Pontual | H04N 21/262 |
| 2006/0245097 | A1 | 11/2006 | Chang et al. | |
| 2007/0052547 | A1 * | 3/2007 | Haughawout | H04N 21/42221 |
| | | | | 340/4.31 |
| 2007/0225828 | A1 * | 9/2007 | Huang | G08C 17/00 |
| | | | | 700/11 |
| 2010/0289685 | A1 * | 11/2010 | Pratt | G08C 17/02 |
| | | | | 341/176 |
| 2010/0302058 | A1 * | 12/2010 | Belz | G08C 17/02 |
| | | | | 340/12.28 |
| 2012/0119998 | A1 * | 5/2012 | Sato | H04N 21/47 |
| | | | | 345/169 |
| 2013/0132094 | A1 * | 5/2013 | Lim | G10L 15/22 |
| | | | | 704/E11.001 |
| 2013/0258207 | A1 | 10/2013 | Kim et al. | |
| 2014/0055675 | A1 | 2/2014 | An et al. | |
| 2014/0266639 | A1 * | 9/2014 | Zises | G08C 17/02 |
| | | | | 340/12.28 |
| 2014/0313420 | A1 * | 10/2014 | Kim | H04N 5/4403 |
| | | | | 348/734 |
| 2014/0333509 | A1 * | 11/2014 | Yuann | G06F 3/1407 |
| | | | | 345/2.1 |
| 2015/0137959 | A1 | 5/2015 | Kim et al. | |
| 2015/0279208 | A1 * | 10/2015 | Li | G08C 23/04 |
| | | | | 398/106 |
| 2016/0323626 | A1 | 11/2016 | Kim et al. | |
| 2017/0272266 | A1 * | 9/2017 | Zhu | H04N 21/422 |

FOREIGN PATENT DOCUMENTS

| | | |
|---|---|---|
| KR | 10-2005-0032831 A | 4/2005 |
| KR | 10-2006-0110631 A | 10/2006 |
| KR | 10-2015-0056273 A | 5/2015 |
| KR | 10-2015-0071944 A | 6/2015 |

* cited by examiner

DEVICE CONNECTOR

1.Device Selection

Select the device that you want to connect to your TV.

Set-Top Box | Blu-ray/DVD Player | Home Theater | Sound Bar | Game Console

Smartphone | PC | External Storage | Other Bocc

DEVICE CONNECTOR

2.Method Selection (BACK TO MAN) (PREVCUS) (NEXT)

Select which TV port you want to connect your device to.

● HDMI1
HDMI2
HDMI3
COMPONENT
AV

Connected

Prior Art

FIG. 5C

DEVICE CONNECTOR

3.Universal Control>Service Selection
Set.Top Box | HDMI1

(BACK TO MAN) (PREVCUS) (NEXT)

Select set-top box service provider. Set your current location to see the list of services available for that region.

| | | |
|---|---|---|
| D-Smart | Digiturk | Free |
| KDG (Kabel Deutschiand) | Kabel BW | MEO |
| Mediaset | NOS | Net |

Prior Art

|  | REMOTE CONTROLLER MODEL 1 | REMOTE CONTROLLER MODEL 2 | REMOTE CONTROLLER MODEL 3 |
|---|---|---|---|
| MENU KEY CODE | 0x01 | 0x02 | 0x03 |
| CHANNEL + KEY CODE | 0x0a | 0x0a | 0x0b |
| VOLUME + KEY CODE | 0xa1 | 0xa1 | 0xa1 |

SETTING INTEGRATED REMOTE CONTROLLER OF DISPLAY DEVICE

CROSS REFERENCE TO RELATED APPLICATIONS

This application is the National Phase of PCT/KR2016/005863 filed on Jun. 2, 2016, which claims priority under 35 U.S.C. § 119(a) to Patent Application No. 10-2015-0119812 filed in Republic of Korea on Aug. 25, 2015, all of which are hereby expressly incorporated by reference into the present application.

TECHNICAL FIELD

The present invention relates to a display device and a method of setting an integrated remote controller and, more particularly, to automatic setting of an integrated remote controller using screen recognition technology.

BACKGROUND ART

With development of electronic technology and communication technology, various types of electronic device have been developed and diffused. Various types of electronic devices are generally used in home or places of business. In addition, if an electronic device is used, a remote controller is generally used for convenient control of a user.

However, as the number of electronic devices used in home or places of business increases, the number of remote controllers increases. Accordingly, use of an integrated remote controller has been increased in order to efficiently control a plurality of electronic devices.

In order to set an integrated remote controller, information of used devices needs to be registered. That is, a user selects an external device (e.g., set-top box) to be set through a setting menu of the integrated remote controller and selects external input for providing a connection path of the external device. Thereafter, the user selects a manufacturer of the external device or a service provider and verifies a type of a remote controller for operating the external device while pressing buttons of the remote controller, thereby ending settings.

However, in such a conventional method of setting an integrated remote controller, the user should know information on the manufacturer of the external device or the service provider in advance and individually press the buttons of the remote controller to verify the type of the remote controller for operating the external device.

DISCLOSURE

Technical Problem

An object of the present invention is to automatically set an integrated remote controller using screen recognition technology without a user manually setting the integrated remote controller.

Technical Solution

In accordance with one embodiment, a method of setting an integrated remote controller of a display device includes displaying a first image output from an external device connected to the display device, verifying a service provider of the external device using information included in the displayed first image, acquiring a remote controller model for controlling the external device from among a plurality of remote controller models provided by the verified service provider, and transmitting a key code set of the acquired remote controller model to a remote control device.

In accordance with another embodiment, a display device includes a display configured to display an image, an external device interface configured to connect with an external device, a user input interface configured to communicate with a remote control device, and a controller configured to display a first image output from an external device connected to the display device, verify a service provider of the external device using information included in the displayed first image, acquire a remote controller model for controlling the external device from among a plurality of remote controller models provided by the verified service provider, and transmit a key code set of the acquired remote controller model to a remote control device.

The information included in the first image may be a logo indicating the service provider or data for identifying the service provider.

The controller may extract an identification key for identifying the remote controller model, sequentially transmit key codes corresponding to an identification key extracted with respect to the plurality of remote controller models to the, remote control device, and acquire a remote controller model for causing display of a second image from among the plurality of remote controller models based on the key codes if the second image is displayed.

The controller may recognize text configuring the log using optical character recognition (OCR) technology and verify the service provider based on the recognized text.

The controller may acquire a plurality of key code sets corresponding to the plurality of remote controller models and extract a specific key having all different key codes from the plurality of key code sets as the identification key.

The controller may receive the plurality of key code sets from a server of the service provider.

If the extracted identification key is a menu key for outputting a menu window, the second image may be the menu window, and the controller may acquire a remote controller model corresponding to a key code at a point of time if the menu window is displayed.

The external device may be any one of a set-top box, a DVD player, a Blu-ray player, a game console and a sound bar.

Advantageous Effect

According to various embodiments of the present invention, an integrated remote controller is automatically set such that a user who is not used to a smart TV system can conveniently control an external device using a TV remote controller.

In addition, according to the embodiments of the present invention, since screen recognition is used, an integrated remote controller can be automatically set with respect to an external device which does not provide an HDMI consumer electronics control (CEO) function, AV infoframe, etc.

In addition, according to the embodiments of the present invention, since a step of manually setting an integrated remote controller is removed, it is possible to provide user convenience and to facilitate accessibility to the integrated remote controller, thereby leading the user to use the TV remote controller.

DESCRIPTION OF DRAWINGS

FIGS. 5A to 5D are views illustrating a method of manually setting an integrated remote controller by a user according to prior art.

BEST MODE

Embodiments of the present invention will be described below with reference to the attached drawings. The suffixes "module" and "unit" of elements herein are used for convenience of description and thus can be used interchangeably and do not have any distinguishable meanings or functions.

A display device as set forth herein is an intelligent display device equipped with a computer support function in addition to a broadcast reception function, for example. Thus the display device may have user-friendly interfaces such as a handwriting input device, a touchscreen, or a pointing device. Further, because the display device supports wired or wireless Internet, functions such as e-mail transmission/reception, Web browsing, banking, gaming, etc. may be performed by connection with the Internet or a computer. To implement these functions, the display device may operate based on a standard general-purpose Operating System (OS).

Various applications can be freely added to or deleted from, for example, a general-purpose OS kernel in the display device according to the present invention. Therefore, the display device may perform a number of user-friendly functions. The display device may be a network TV, a Hybrid broadcast broadband TV (HbbTV), a smart TV, etc. for example. The display device is applicable to a smartphone, as needed.

Figure 1:
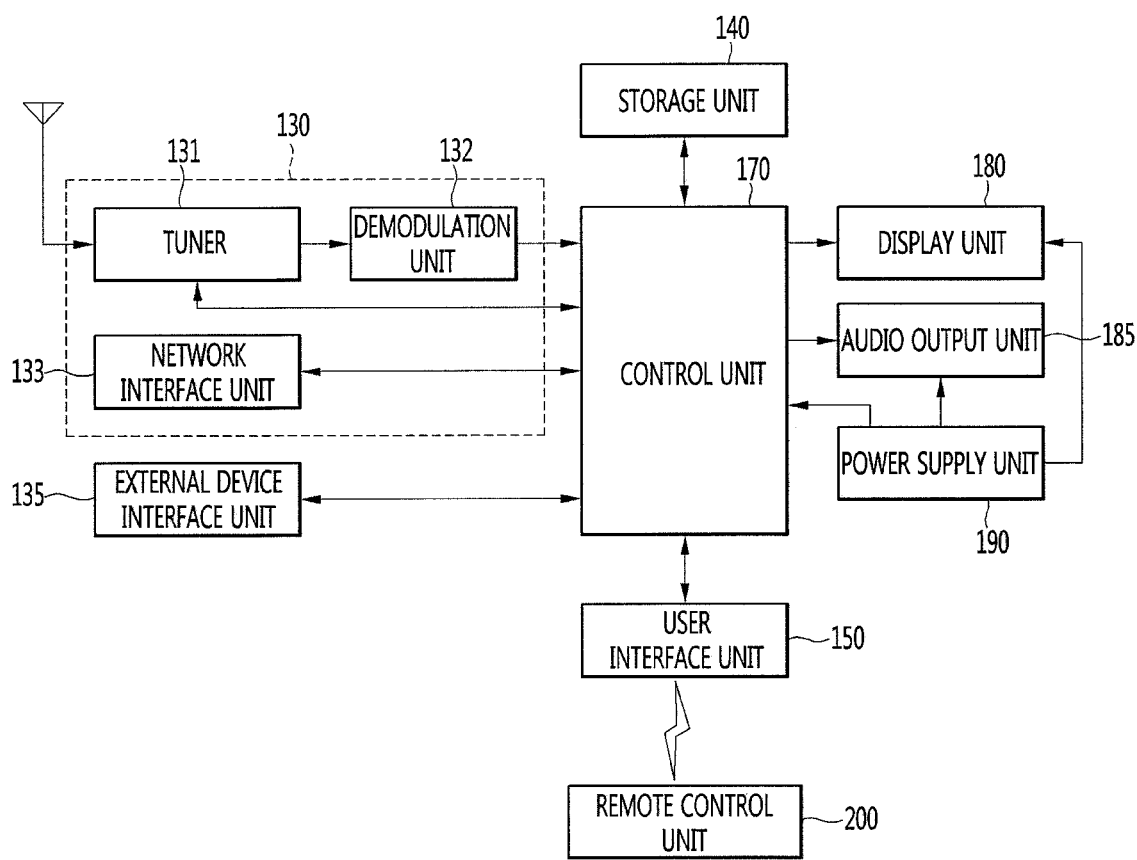
FIG. 1 is a block diagram showing the configuration of a display device according to an embodiment of the present invention.

FIG. 1 is a block diagram showing the configuration of a display device according to an embodiment of the present invention.

Referring to FIG. 1, the display device 100 includes a broadcast receiver 130, an external device interface 135, a memory 140, a user input interface 150, a controller 170, a display 180, an audio output unit 185, and a power supply 190.

The broadcast receiver 130 may include a tuner 110, a demodulator 132 and a network interface 133.

The tuner 131 may select a specific broadcast channel according to a channel selection command. The tuner 131 may receive a broadcast signal of the selected specific broadcast channel.

The demodulator 132 may divide the received broadcast signal into a video signal, an audio signal and a data signal related to a broadcast program and restore the divided video signal, audio signal and data signal in an outputtable form.

The external device interface 135 may receive and deliver applications or a list of applications in an adjacent external device to the controller 170 or the memory 140.

The external device interface 135 may provide an interface with an external device. The external device interface 135 may receive and deliver one or more of video and audio output from the external device to the controller 170. The external device connectable to the external device interface 135 may be any one of a set-top box, a Blu-ray player, a DVD player, a game console, a sound bar, a smartphone, a PC, a USB memory and a home theater.

The network interface 133 serves as an interface between the display device 100 and a wired/wireless network such as the Internet. The network interface 133 may transmit or receive data to or from another user or another electronic device through the connected network or another network linked to the connected network.

In addition, some content data stored in the display device 100 may be transmitted to a selected user or a user electronic device among other users or electronic devices pre-registered with the display device 100.

The network interface 133 may access a predetermined web page through the connected network or another network linked to the connected network. That is, the network interface may access the predetermined web page through the network to transmit or receive data to or from a corresponding server.

In addition, the network interface 133 may receive content or data from a content provider or a network provider. That is, the network interface 133 may receive content such as movies, advertisements, games, VOD files or broadcast signals and information related thereto from the content provider or the network provider through the network.

In addition, the network interface 133 may receive update information about firmware and update files of the firmware from the network provider. The network interface may transmit data over the Internet or to the content provider or the network provider.

The network interface 133 may selectively receive a desired application among opened applications over a network.

The memory 140 may store various programs necessary for signal processing and control in the controller 170 to process and control signals, and may also store processed video, audio and data signals.

The memory 140 may temporarily store a video, audio and/or data signal received from the external device interface 135 or the network interface 133. The memory may store information about a predetermined image by a channel storage function.

The memory 140 may store applications or a list of applications received from the external device interface 135 or the network interface 133.

The display device 100 may reproduce and provide content files (moving image files, still image files, music files, text files, and application files) stored in the memory 140 to the user.

The user input interface 150 transmits a signal received from the user to the controller 170 or transmits a signal received from the controller 170 to the user. For example, the user input interface 150 may receive and process various control signals such as a power-on/off signal, a channel selection signal, and a screen setting signal from a remote control device 200 or may transmit a control signal received from the controller 170 to the remote control device 200, according to various communication schemes, for example, Bluetooth, WB (Ultra Wideband), ZigBee, RF communication and IR communication.

In addition, the user input interface 150 may deliver control signals received from local keys (not shown), such as a power key, a channel key, and a volume key, and setting values to the controller 170.

The video signal processed by the controller 170 may be input to the display 180 to be displayed as an image corresponding to the video signal. In addition, the video signal processed by the controller 170 may be input to an external input/output device through the external device interface 135.

The audio signal processed by the controller 170 may be audibly output through the audio output unit 185. In addition, the audio signal processed by the controller 170 may be input to the external input/output device through the external device interface 135.

The controller 170 may control overall operation of the display device 100.

In addition, the controller 170 may control the display device 100 according to a user command received through the user input interface 150 or according to an internal program, and may access a network and download an application or application list selected by the user to the display device 100 over the network.

The controller 170 may output channel information selected by the user through the display 180 or the audio output unit 185 along with the processed video or audio signal.

In addition, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller may control the display 180 to display a broadcast image received from the tuner 131, an external input image received through the external device interface 135, an image received through the network interface, or an image stored in the memory 140. The image displayed on the display 180 may be a Two-Dimensional (2D) or Three-Dimensional (3D) still image or moving picture.

In addition, the controller 170 may perform control to reproduce content stored in the display device 100, received broadcast content or external input content. The content may include at least one of a broadcast image, an external input image, an audio file, a still image, a Web page, or a text file.

The display 180 may convert a processed video signal, a processed data signal, and an OSD signal received from the controller 170 or a video signal and a data signal received from the external device interface 135 into RGB signals, thereby generating driving signals.

The display device 100 illustrated in FIG. 1 is purely exemplary. Depending upon the specifications of the display device 100 in actual implementation, the components of the display device 100 may be combined or omitted or new components may be added.

That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

According to another embodiment of the present invention, unlike the configuration illustrated in FIG. 1, the display device 100 may be configured so as to receive and play video content back through the network interface 130 or the external device interface 135, without the tuner 100 and the demodulator 120.

For example, the display device 100 may be implemented by an image processing device such as a set-top box for receiving content according to various network interfaces or a broadcast signal and a content playback device for playing back content received from the image processing device.

In this case, the method of operating the display device according to the embodiment of the present invention may be performed by the display device 100 described with reference to FIG. 1 or any one of the image processing device such as the set-top box or the content playback device including the display 180 and the audio output unit 185.

Next, the remote control device according to an embodiment of the present invention will be described with reference to FIGS. 2 to 3.

Figure 2:
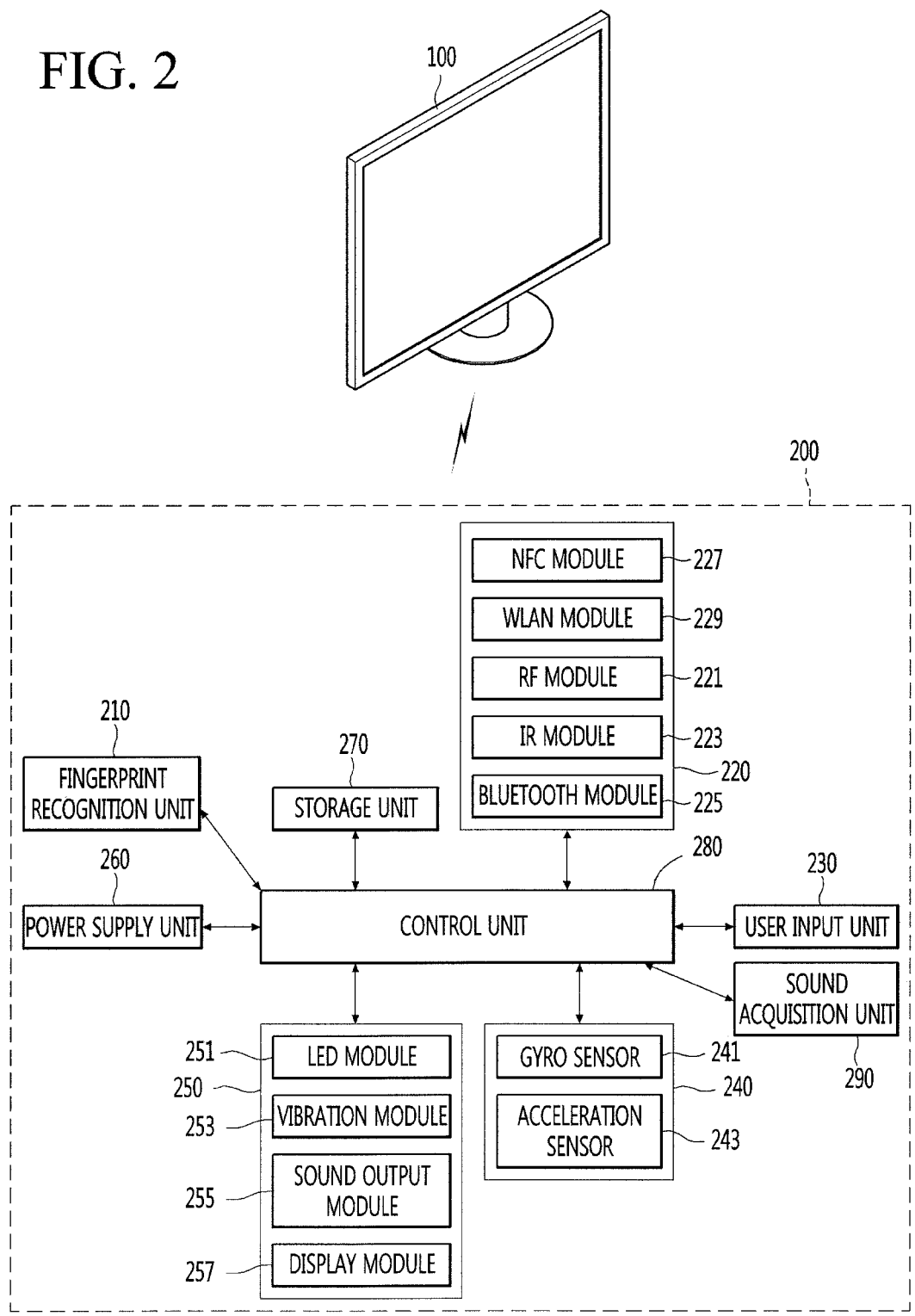
FIG. 2 is a block diagram showing a remote control device according to an embodiment of the present invention.
Figure 3:
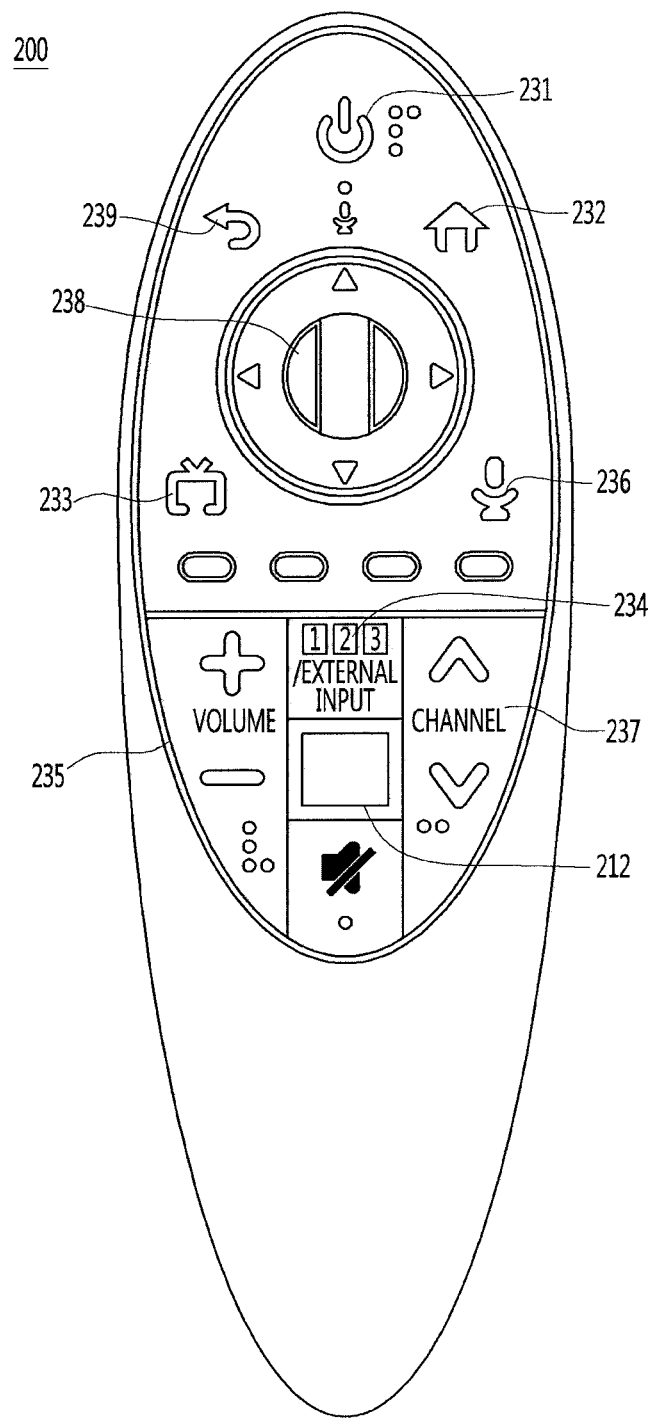
FIG. 3 is a diagram showing an actual configuration example of a remote control device according to an embodiment of the present invention.

FIG. 2 is a block diagram showing a remote control device according to an embodiment of the present invention, and FIG. 3 is a diagram showing an actual configuration example of a remote control device according to an embodiment of the present invention.

First, referring to FIG. 2, the remote control device 200 may include a fingerprint recognizer 210, a wireless communication unit 220, a user input unit 230, a sensor unit 240, an output unit 250, a power supply 260, a memory 270, a controller 280 and a voice acquisition unit 290.

Referring to FIG. 2, the wireless communication unit 225 transmits and receives signals to and from any one of the display devices according to the above-described embodiments of the present invention.

The remote control device 200 may include an RF module for transmitting and receiving signals to and from the display device 100 according to an RF communication standard and an IR module 223 for transmitting and receiving signals to and from the display device 100 according to an IR communication standard. In addition, the remote control device 200 may include a Bluetooth module 225 for transmitting and receiving signals to and from the display device 100 according to a Bluetooth communication standard. In addition, the remote control device 200 may include an NFC module 227 for transmitting and receiving signals to and from the display device 100 according to a NFC (Near Field Communication) standard and a WLAN module 229 for transmitting and receiving signals to and from the display device 100 according to a WLAN (wireless LAN) communication standard.

In addition, the remote control device 200 may transmit a signal including information about movement of the remote control device 200 to the display device 100 via the wireless communication unit 220.

Meanwhile, the remote control device 200 may receive a signal transmitted by the display device 100 through the RF module 221, and, if necessary, may transmit commands associated with power on/off, channel change, volume change, etc. to the display device 100 through the IR module 223.

The user input unit 230 may be composed of a keypad, a button, a touch pad or a touchscreen. The user may enter a command related to the display device 100 to the remote control device 200 by manipulating the user input unit 230. If the user input unit 230 includes hard keys, the user may enter commands related to the display device 100 to the remote control device 200 by pushing the hard keys. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238 and a back button 239.

The fingerprint recognition button 212 may be used to recognize the fingerprint of the user. As one embodiment, the fingerprint recognition button 212 may perform push operation to receive push operation and fingerprint recognition operation. The power button 231 may be used to turn the display device 100 on/off. The home button 232 may be used to move to the home screen of the display device 100. The live button 233 may be used to display a real-time broadcast program. The external input button 234 may be used to receive input of an external device connected to the display device 100. The volume control button 235 may be used control the level of the volume output by the display device 100. The voice recognition button 236 may be used to receive user voice and to recognize the received voice. The channel change button 237 may be used to receive the broadcast signal of a specific broadcast channel. The OK button 238 may be used to select a specific function, and the back button 239 may be used to return to a previous screen.

FIG. 2 will be described again.

If the user input unit 230 includes a touchscreen, the user may touch a soft key of the touchscreen to input a command related to the display device 100 to the remote control device 200. In addition, the user input unit 230 may have a variety of input means which may be manipulated by the user, such as a scroll key, a jog key, etc., to which the present invention is not limited.

The sensor unit 240 may include a gyro sensor 241 or an acceleration sensor 243. The gyro sensor 241 may sense information about movement of the remote control device 200.

For example, the gyro sensor 241 may sense information about movement of the remote control device 200 along x, y and z axes. The acceleration sensor 243 may sense information about the velocity of the remote control device 200. The remote control device 200 may further include a distance measurement sensor for sensing a distance from the display 180 of the display device 100.

The output unit 250 may output a video or audio signal corresponding to manipulation of the user input unit 230 or a signal transmitted by the display device 100. The user may recognize whether the user input unit 230 has been manipulated or the display device 100 has been controlled through the output unit 250.

For example, the output unit 250 may include a Light Emitting Diode (LED) module 251 for emitting light if the user input unit 230 has been manipulated or a signal is transmitted to or received from the display device 100 through the wireless communication unit 225, a vibration module 253 for generating vibrations, an audio output module 255 for outputting audio, or a display module 257 for outputting video.

The power supply 260 supplies power to the remote control device 200. If the remote control device 200 is kept stationary for a predetermined time, the power supply 260 blocks power from the remote control device 200, thereby preventing waste of power. If a predetermined key of the remote control device 200 is manipulated, the power supply 260 may resume power supply.

The memory 270 may store a plurality of types of programs required for control or operation of the remote control device 200, or application data. If the remote control device 200 transmits and receives signals to and from the display device 100 wirelessly through the RF module 221, the remote control device 200 and the display device 100 perform signal transmission and reception in a predetermined frequency band.

The controller 280 of the remote control device 200 may store information about the frequency band in which signals are wirelessly transmitted and received to and from the display device 100 paired with the remote control device 200 in the memory 270 and refer to the information.

The controller 280 provides overall control to the remote control device 200. The controller 280 may transmit a signal corresponding to predetermined key manipulation on the user input unit 235 or a signal corresponding to a movement of the remote control device 200 sensed by the sensor unit 240 to the display device 100 through the wireless communication unit 225.

In addition, the voice acquisition unit 290 of the remote control device 200 may acquire voice.

The voice acquisition unit 290 may include at least one microphone 291 and acquire voice through the microphone 291.

Next, FIG. 4 will be described.

Figure 4:
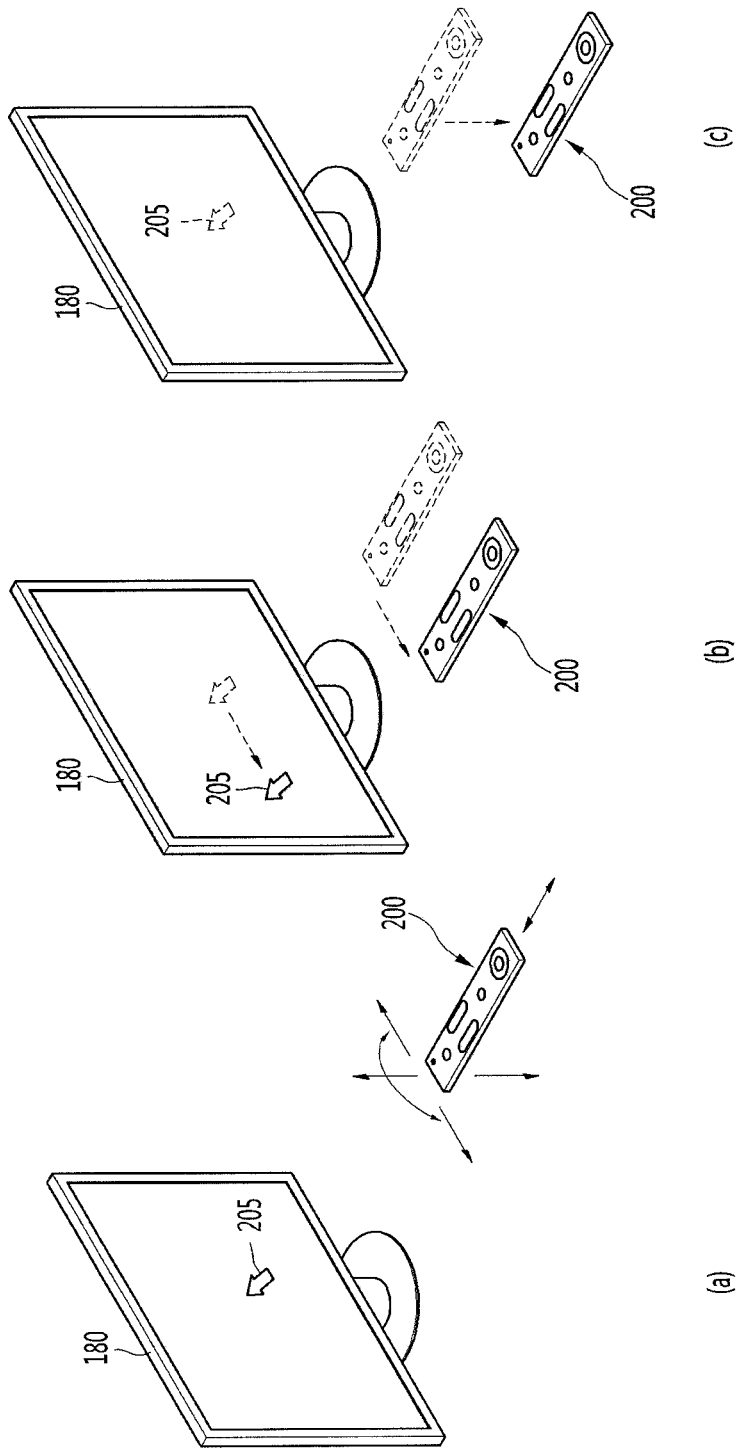
FIG. 4 is a diagram showing an example of using a remote control device according to an embodiment of the present invention.

FIG. 4 is a diagram showing an example of using a remote control device according to an embodiment of the present invention.

(a) of FIG. 4 illustrates a pointer 205 corresponding to the remote control device 200 displayed on the display 180.

The user may move or rotate the remote control device 200 up and down, side to side. The pointer 205 displayed on the display 180 of the display device 100 corresponds to a movement of the remote control device 200. Since the pointer 205 moves in accordance with the movement of the remote control device 200, the remote control device 200 may be referred to as a pointing device.

(b) of FIG. 4 shows the case where the pointer 205 moves to the left on the display 180 of the display device 100 if the user moves the remote control device 200 to the left.

Information on movement of the remote control device 200 sensed through the sensor of the remote control device 200 is transmitted to the display device 100. Then, the display device 100 calculates the coordinates of the pointer 205 from information on movement of the remote control device 200. The display device 100 may display the pointer 205 to correspond to the calculated coordinate.

(c) of FIG. 4 shows the case where, in a state of pressing a specific button of the remote control device 200, the user moves the remote control device 200 away from the display 180. Then, a selected area corresponding to the pointer 205 may be zoomed in on and enlarged on the display 180.

On the contrary, if the user moves the remote control device 200 toward the display 180, the selection area corresponding to the pointer 205 is zoomed out and thus contracted on the display 180.

If the remote control device 200 moves away from the display 180, the selected area may be zoomed out and, if the remote control device 200 approaches the display 180, the selected area may be zoomed in.

With the predetermined button pressed in the remote control device 200, the up, down, left and right movements of the remote control device 200 may be ignored. That is, if the remote control device 200 moves away from or approaches the display 180, only the back and forth movements of the remote control device 200 are sensed, while the up, down, left and right movements of the remote control device 200 are ignored. Unless the predetermined button is pressed in the remote control device 200, the pointer 205 moves in accordance with the up, down, left or right movement of the remote control device 200.

The speed and direction of the pointer 205 may correspond to the speed and direction of the remote control device 200.

The pointer 205 of the specification is an object displayed on the display 180 in correspondence with the movement of the remote control device 200. Therefore, the pointer 205 may have various shapes other than the arrow illustrated in the figure. For example, the pointer 205 may be a dot, a cursor, a prompt, a thick outline, etc. The pointer 205 may be displayed across a plurality of points, such as a line and a surface, as well as at a single point on horizontal and vertical axes.

Next, a method of setting an integrated remote controller according to an embodiment of the present invention will be described.

FIGS. 5A to 5D are views illustrating a method of manually setting an integrated remote controller by a user according to prior art.

Figure 5A:
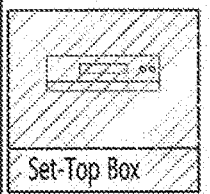
Figure 5A:
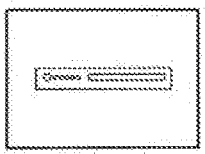
Figure 5A:
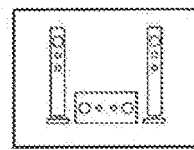
Figure 5A:
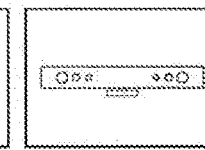
Figure 5A:
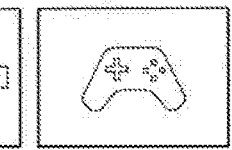
Figure 5A:
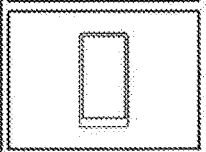
Figure 5A:
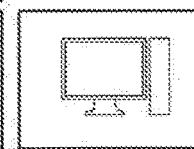
Figure 5A:
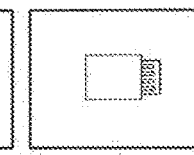
Figure 5A:
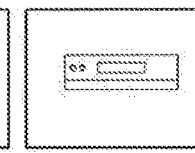

FIGS. 5A to 5D show menu windows for setting the integrated remote controller. Referring to FIG. 5A, the user selects an external device to be connected to the display device 100 from among a plurality of external devices. Here, assume that a set-top box is selected.

Figure 5B:
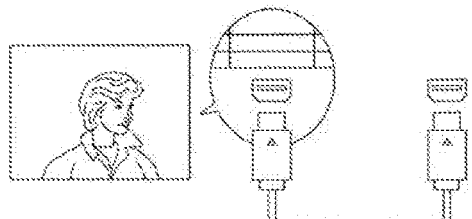

FIG. 5B shows a process of selecting an interface (or external input) for connecting the set-top box to the display device 100 by a user. Here, assume that an HDMI 1 terminal is selected.

FIG. 5C shows a process of selecting a service provider of the set-top box connected to the display device 100. The user should know the service provider or manufacturer of the set-top box in advance. The user selects the service provider or manufacturer of the set-top box.

Figure 5D:
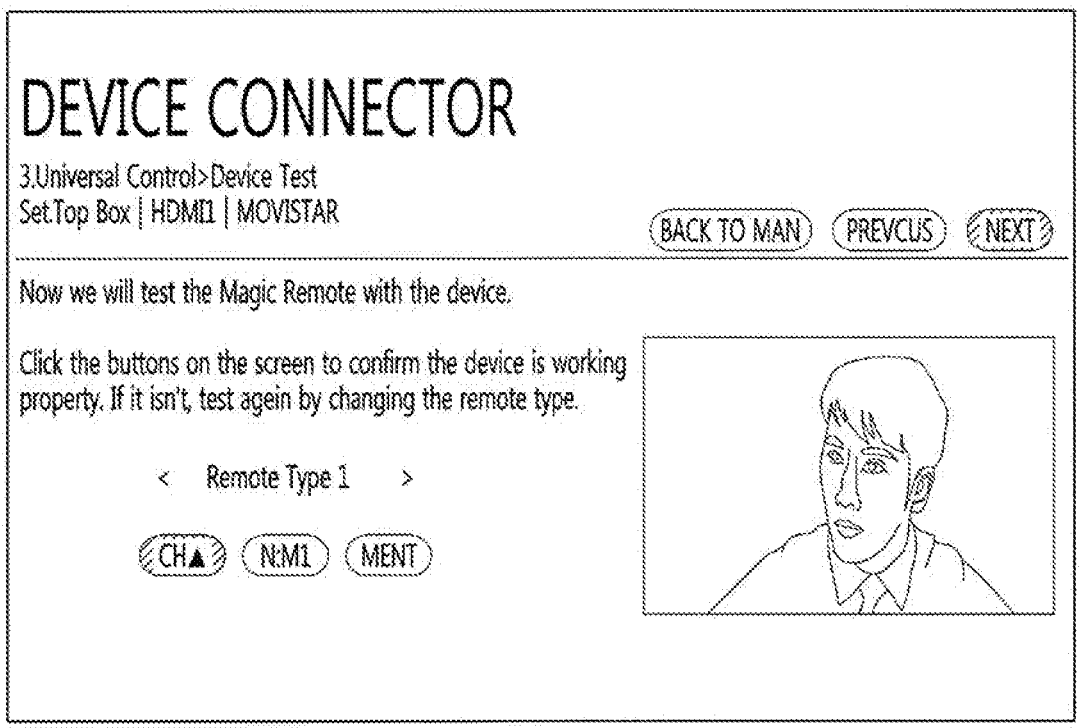

FIG. 5D shows a process of selecting a remote controller model (or type) provided by the service provider or manufacturer of the selected set-top box. The user inputs a channel change key with respect to each remote controller model to individually determine whether channel change is performed. If the user detects a remote controller model capable of performing channel change, the user sets the remote controller to the remote controller model and ends the integrated remote controller.

Conventionally, in order to set the integrated remote controller, the user should know information on the manufacturer of the external device or the service provider in advance and individually press the button of the remote controller to detect a remote controller type capable of performing operation.

Hereinafter, a method of automatically setting an integrated remote controller at the display device 100 will be described.

Figure 6:
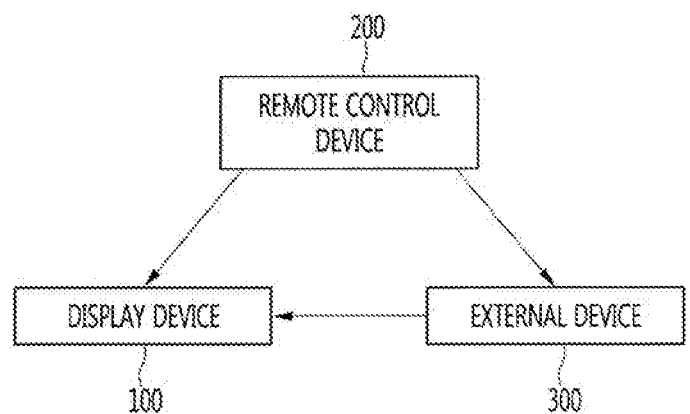
FIG. 6 is a diagram illustrating the configuration of a system according to an embodiment of the present invention.

FIG. 6 is a diagram illustrating the configuration of a system according to an embodiment of the present invention.

The system according to the embodiment of the present invention may include a display device 100, a remote control device 200 and an external device 300.

Operation of the display device 100 may be controlled according to a control command of the remote control device 200. The display device 100 may be connected to the external device 300 to output information output by the external device 300. The display device 100 may automatically set the integrated remote controller such that the remote control device 200 controls the external device 300. This will be described in detail below.

The remote control device 200 may control operation of the display device 100. If the remote control device 200 is set such that the display device 100 has an integrated remote controller function, the remote control device 200 may control operation of the external device 300.

The external device 300 may be connected to the display device 100 to output one or more of video and audio to display device 100. The external device 300 may be connected through the external device interface 135 of the display device 100. The external device 300 may be any one of a set-top box, a Blu-ray player, a DVD player, a game console, a sound bar, a smartphone, a PC, a USB memory and a home theater. The external device 300 may include one or more of the components described with reference to FIG. 1.

Figure 7:
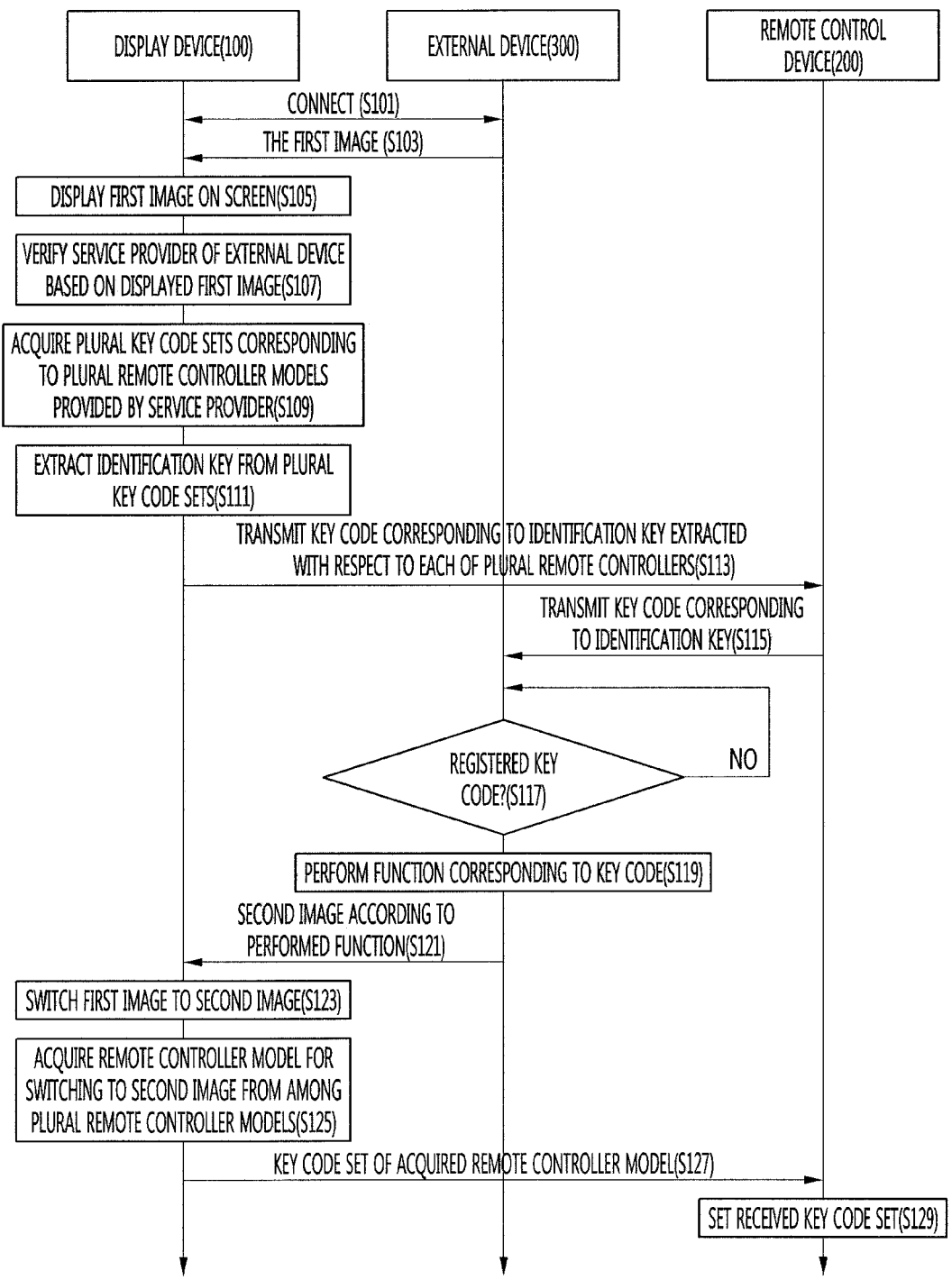
FIG. 7 is a ladder diagram of a system illustrating a method of setting an integrated remote controller according to an embodiment of the present invention.

FIG. 7 is a ladder diagram of a system illustrating a method of setting an integrated remote controller according to an embodiment of the present invention.

Referring to FIG. 7, the display device 100 is connected to the external device 300 (S101). The display device 100 and the external device 300 may be connected by wire or wirelessly. The display device 100 may be connected to the external device 300 through the external device interface 135. The external device interface 135 may provide an interface with the external device 300. If the display device 100 and the external device 300 are connected by wire, the external device interface 135 may include an interface terminal. For example, the connection terminal may be a HDMI (High Definition Multi Interface) terminal.

The controller 170 of the display device 100 receives a first image output from the external device 300 through the external device interface 135 (S103), and displays the received first image on the screen of the display 180 (S105). If the display device 100 and the external device 300 are connected and the external device 300 is powered on, the external device 300 may output the first image. The controller 170 may receive the first image output through the external device interface 135 and display the received first image on the screen of the display 180.

In one embodiment, the first image may include service information provided through the external device 300. For example, the first image may be a channel guide image. The first image may include one or more of information on a service provider for providing a service through the external device 300, information on the manufacturer of the external device 300, and data for identifying the external device 300.

In another embodiment, if the external device 300 is connected and the external device 300 is powered on, the controller 170 may receive information on the external device 300 from the external device 300. The information on the external device 300 may include data for identifying the external device 300. The data for identifying the external device 300 may include one or more of the name of the service provider for providing a service through the external device 300, the name of the manufacturer of the external device 300, and the model name of the external device 300. The controller 170 of the display device 100 verifies the service provider of the external device 300 based on the displayed first image (S107). In one embodiment, the controller 170 may verify the service provider of the external device 300 using screen recognition technology. The screen recognition technology may be technology for perceiving the logo of the service provider included in the image displayed on the screen and recognizing the service provider through the perceived logo. The controller 170 may identify the service provider through the logo included in the first image using optical character recognition (OCR) technology. In general, the logo is composed of characters. The controller 170 may recognize the logo included in the first image through OCR technology and verify the service provider of the external device 300 through the recognized logo.

In another embodiment, the controller 170 may verify the service provider of the external device 300 using the data for identifying the external device 300 received from the external device 300.

The controller 170 of the display device 100 acquires a plurality of key code sets corresponding to a plurality of remote controller models provided by the verified service provider (S109). The service provider may provide various remote controller models. The server of the service provider stores the key code set corresponding to each remote controller model. That is, the plurality of key code sets may correspond to the plurality of remote controller models, respectively. The key code set may include a plurality of key codes corresponding to a plurality of buttons provided in the remote controller. One key code may correspond to one function for controlling the external device 300. The remote controller may include a key code in an IR signal and transmit the key code to the external device 300.

In one embodiment, the controller 170 may receive the plurality of key code sets from the server of the service provider and store the plurality of received key code sets in the memory 140.

In another embodiment, the display device 100 may pre-store the plurality of key code sets corresponding to the plurality of remote controller models provided by the service provider of the external device 300.

Steps S101 and S109 will be described with reference to FIG. 8.

Figures 8, 9:
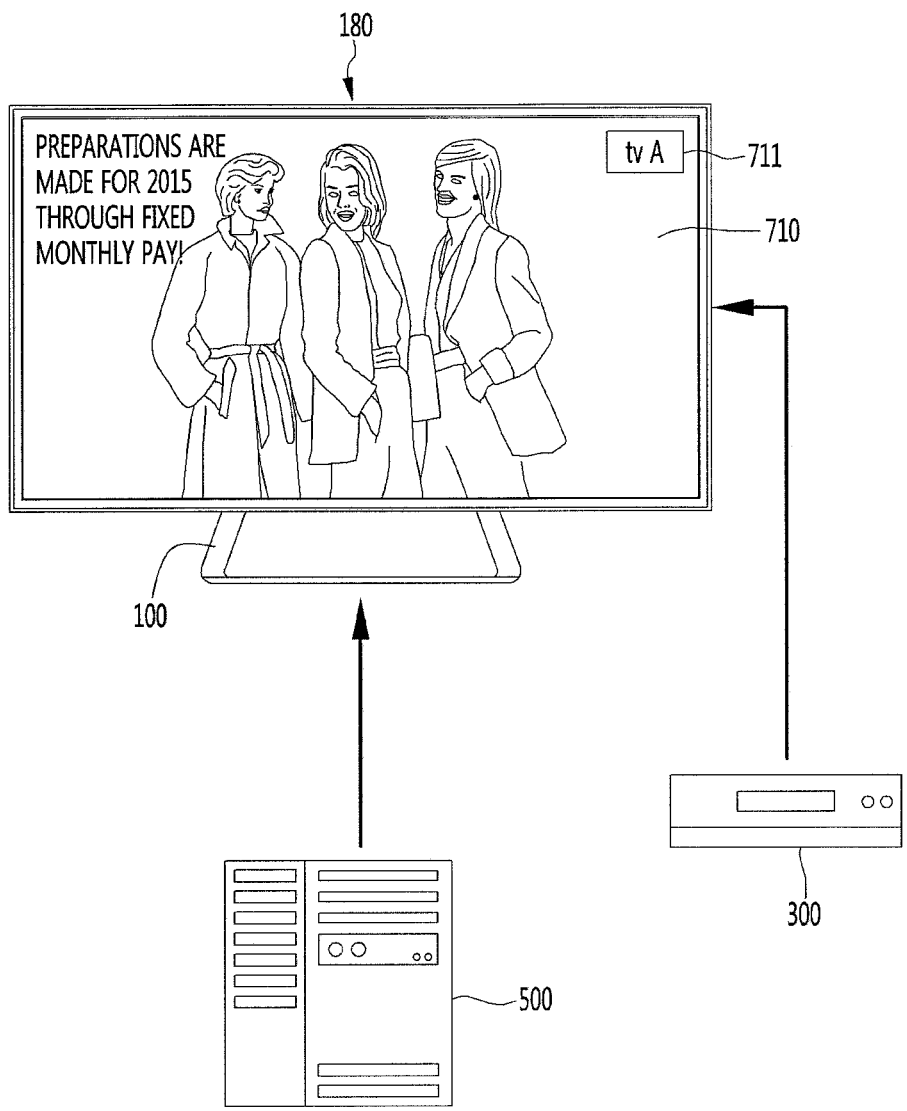
FIG. 8 is a diagram illustrating a method of verifying a service provider of an external device using screen recognition technology according to an embodiment of the present invention.
FIG. 9 is a diagram illustrating a method of extracting an identification key from key code sets corresponding to a plurality of remote controller models according to an embodiment of the present invention.

FIG. 8 is a diagram illustrating a method of verifying a service provider of an external device using screen recognition technology according to an embodiment of the present invention.

Referring to FIG. 8, the display device 100 is connected to the external device 300. If the external device 300 is powered on, the first image 710 output from the external device 300 may be displayed on the display 180. The first image 710 may be a channel guide page. The controller 170 may recognize a logo 711 included in the first image 710. The controller 170 may recognize text (tv A) configuring the logo 711 using OCR technology. The controller 170 may verify the service provider of the connected external device 300 using the recognized logo 711. The controller 170 may request the plurality of key code sets corresponding to the plurality of the remote controller models from the server 500 of the verified service provider and receive the plurality of key code sets in response to the request.

FIG. 7 will be described again.

The controller 170 of the display device 100 extracts an identification key from the plurality of acquired key code sets (S111). In one embodiment, the identification key may be used to identify a specific remote controller model from the plurality of remote controller models. That is, the identification key may be used to extract the specific remote controller model, in order for the remote control device 200 to control both the display device 100 and the external device 300, that is, in order to have the function of the integrated remote controller.

Each remote controller model may have a key code set corresponding thereto. If the key codes of the plurality of remote controller models corresponding to a specific key are all different, the controller 170 may set the key as an identification key. This will be described with reference to FIG. 9.

FIG. 9 is a diagram illustrating a method of extracting an identification key from key code sets corresponding to a plurality of remote controller models according to an embodiment of the present invention.

In FIG. 9, assume that 3 remote controller models (a remote controller model 1, a remote controller model 2, a remote controller model 3) are present, but this is merely exemplary.

A channel up key code corresponding to a channel up key may be 0x0a in the remote controller model 1, may be 0x0a in the remote controller model 2, and may be 0x0b in the remote controller model 3. Since the remote controller model 1 and the remote controller model 2 are equal in the channel up key code corresponding to the channel up key, the controller 170 does not set the channel up key as an identification key.

A volume up key code corresponding to a volume up key may be 0xa1 in the remote controller model 1, may be 0xa1 in the remote controller model 2, and may be 0xa1 in the remote controller model 3. Since the remote controller model 1, the remote controller model 2 and the remote controller model 3 are all equal in the channel up key code corresponding to the channel up key, the controller 170 does not set the channel up key as an identification key. That is, if the key codes corresponding to the specific key are equal, since the remote controller model cannot be identified, the controller 170 does not use the key as the identification key.

The menu key code corresponding to a menu key may be 0x01 in the remote controller model 1, may be 0x02 in the remote controller model 2, and may be 0x03 in the remote controller model 3. Since the remote controller models are different in the menu key code corresponding to the menu key, the controller 170 may set the menu key as an identification key.

FIG. 7 will be described again.

The controller 170 of the display device 100 transmits the key code corresponding to the identification key extracted with respect to each of the plurality of remote controller models to the remote control device 200 (S113). The controller 170 may sequentially transmit, to the remote control device 200, the key codes corresponding to the identification key with respect to the plurality of remote controller models. The controller 170 may sequentially transmit IR signals including the key codes corresponding to the identification key to the remote control device 200 through the user input interface 150.

For example, the controller 170 may first transmit 0x01 which is the menu key code of the remote controller model 1 to the remote control device 200, and the remote control device 200 may transmit the received key code to the external device 300. Thereafter, the controller 170 may transmit 0x02 which is the menu key code of the remote controller model 2 to the remote control device 200, and the remote control device 200 may transmit the received key code to the external device 300. The controller 170 may sequentially transmit the menu key codes of the remote controller models to the remote control device 200.

Before the key codes corresponding to the identification key are transmitted to the remote control device 200, the controller 170 may display a notification message instructing the remote control device 200 to be directed to the external device 300 through the display 180.

The remote control device 200 transmits the key codes received from the display device 100 to the external device 300 (S115). The remote control device 200 may also sequentially transmit the IR signals including the key codes received from the display device 100 to the external device 300.

The external device 300 determines whether the key code received from the remote control device 200 is a registered key code (S117). The external device 300 may determine whether the received key code is a key code stored in the external device 300, and perform a function corresponding to the key code if the received key code is a key code stored in the external device 300. If the received key code is a key code which is not stored, the external device 300 may not perform any function.

The external device 300 performs a function corresponding to the key code if the received key code is a registered key code (S119), and outputs and delivers a second image according to the performed function to the display device 100 (S121). In one embodiment, if the key code corresponding to the identification key is a menu key code, the external device 300 may output a menu window including a plurality of menus. That is, the second image may be a menu window.

The controller 170 of the display device 100 switches the first image to the second image according to reception of the second image (S123). In one embodiment, the controller 170 may switch the first image to the second image and display the second image on the screen.

In another embodiment, the controller 170 may display the second image on the screen such that the second image overlaps the first image.

In another embodiment, if a control command is received from the external device 300, the controller 170 may verify a remote control model, the key code of which has been received, at a point of time if the control command is received. The controller 170 may set the integrated remote controller of remote control device 200 to the remote controller model. Here, the control command may be any one of a command for displaying a menu window, a command for changing a channel and a command for controlling a volume.

In another embodiment, the controller 170 may sense change in operation of the external device 300 in correspondence with the key code received by the external device 300 from remote control device 200. The controller 170 may acquire a remote controller model corresponding to the key code causing change in operation of the external device 300.

The controller 170 of the display device 100 acquires the remote controller model for switching the first image to the second image from among the plurality of remote controller models (S125), and transmits the key code set of the acquired remote controller model to the remote control device 200 (S127). That is, the controller 170 may set the remote control device 200 to the remote controller model through the key codes of the remote controller model corresponding to the point of time if the first image is switched to the second image.

The remote control device 200 stores the key code set of the remote controller model received from the display device 100 (S129). The remote control device 200 may store the received key code set of the remote controller model, thereby having an integrated remote controller function capable of controlling the external device 300. Steps S113 to S129 will be described with reference to FIG. 10.

Figure 10:
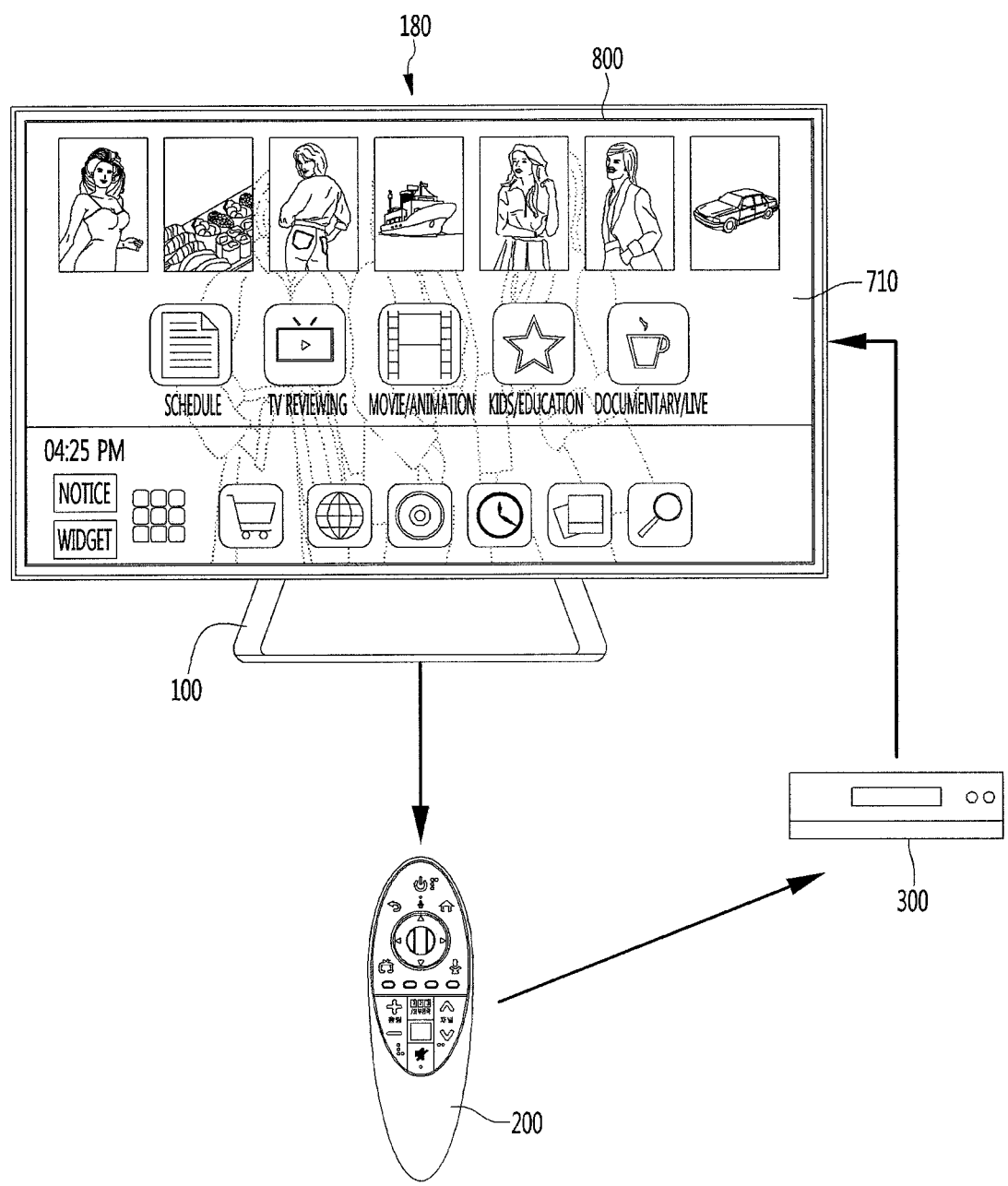
FIG. 10 is a diagram illustrating a process of automatically setting a remote control device to have an integrated remote controller function using a key code corresponding to an identification key according to an embodiment of the present invention.

FIG. 10 is a diagram illustrating a process of automatically setting a remote control device to have an integrated remote controller function using a key code corresponding to an identification key according to an embodiment of the present invention.

Referring to FIG. 10, the display device 100 may sequentially transmit, to the remote control device 200, the key codes corresponding to the identification key with respect to the plurality of remote controller models. The remote control device 200 may sequentially transmit the received key codes to the external device 300. If the key code received from the remote control device 200 is a registered key code, the external device 300 may perform a function corresponding to the key code.

For example, if the function corresponding to the key code is a menu window output function, the external device 300 may output a menu window 800. The display device 100 may receive and display the menu window 800 output from the external device 300 on the screen of the display 180. The display device 100 may verify the key code corresponding to a point of time if the menu window 800 is received and determine to which remote controller model the key code corresponds. For example, if the menu key code of the remote controller model 2 is transmitted to the external device 300 and the external device 300 transmits the menu window 800 to the display device 100 in correspondence with the received key code, the display device 100 may confirm that the external device 300 operates by the menu key code of the remote controller model 2 corresponding to a time of time if the menu window 800 is received. The display device 100 may transmit the key code set of the confirmed remote controller model to the remote control device 200. The remote control device 200 may store the received key code set.

The display device 100 may automatically set the remote control device 200 to have an integrated remote controller function. Therefore, the user does not need to set the integrated remote controller without a complicated process.

According to the embodiment of the present invention, the above-described method may be implemented as code that can be written to a processor-readable recording medium and can thus be read by a processor. Examples of the processor-readable recording medium include a ROM, a RAM, a CD-ROM, a magnetic tape, a floppy disk, an optical data storage, and a carrier wave (e.g., data transmission over the Internet).

The above-described display device is not limited to the configurations and methods of the above-described embodiments and all or some of the embodiments may be selectively combined such that various modifications are possible.

The invention claimed is:

1. A method of setting an integrated remote controller of a display device, the method comprising:
    displaying a first image output from an external device connected to the display device;
    determining a service provider of the external device using information included in the displayed first image;

acquiring a plurality of key code sets corresponding to a plurality of remote controller models provided by the determined service provider;

if values of a key code from each of the plurality of key code sets representing a same function are all different, determining a specific key corresponding to the plurality of key codes as an identification key used for identifying a remote controller model from the plurality of remote controller models, wherein the plurality of key codes correspond to the identification key provided in a remote control device;

sequentially transmitting the plurality of key codes corresponding to the identification key to the remote control device, wherein each of the plurality of key codes corresponds to each of the plurality of remote controller models;

determining a key code set corresponding to a key code among the plurality of key codes as the key code set of the remote control model of the external device if an operation change of the external device is detected according to key codes transmitted from the remote control device to the external device; and transmitting the key code set of the acquired remote controller model to the remote control device.

2. The method according to claim 1, wherein the information included in the first image is a logo indicating the service provider or data for identifying the service provider.

3. The method according to claim 2, wherein the identifying of the service provider of the external device includes:

recognizing text configuring the log using optical character recognition (OCR) technology; and identifying the service provider based on the recognized text.

4. The method according to claim 1, further comprising:

wherein the acquiring of the remote controller model includes acquiring a remote controller model for causing display of a second image from among the plurality of remote controller models based on the key codes if the second image is displayed.

5. The method according to claim 4, wherein, if the determined identification key is a menu key for outputting a menu window, the second image is the menu window, and wherein the acquiring of the remote controller model includes acquiring a remote controller model corresponding to a key code at a point of time if the menu window is displayed.

6. The method according to claim 1, wherein the acquiring of the plurality of key code sets includes receiving the plurality of key code sets from a server of the service provider.

7. The method according to claim 1, wherein the external device is any one of a set-top box, a DVD player, a Blu-ray player, a game console and a sound bar.

8. A display device comprising:
a display configured to display an image;
an external device interface configured to connect with an external device;
a user input interface configured to communicate with a remote control device; and
a controller configured to:
display a first image output from an external device connected to the display device,
determine a service provider of the external device using information included in the displayed first image,
acquire a plurality of key code sets corresponding to a plurality of remote controller models provided by the determined service provider,
if values of a key code from each of the plurality of key code sets representing same function are all different, determine a specific key corresponding to the plurality of key codes as an identification key used for identifying a remote controller model from the plurality of remote controller models, wherein the plurality of key codes correspond to the identification key provided in a remote control device,
sequentially transmit the plurality of key codes corresponding to the identification key to the remote control device, wherein each of the plurality of key codes corresponds to each of the plurality of remote controller models,
determine a key code set corresponding to a key code among the plurality of key codes as the key code set of the remote control model of the external device if an operation change of the external device is detected according to key codes transmitted from the remote control device to the external device, and
transmit the key code set of the acquired remote controller model to the remote control device.

9. The display device according to claim 8, wherein the information included in the first image is a logo indicating the service provider or data for identifying the service provider.

10. The display device according to claim 9, wherein the controller recognizes text configuring the log using optical character recognition (OCR) technology and verifies the service provider based on the recognized text.

11. The display device according to claim 8, wherein the controller receives the plurality of key code sets from a server of the service provider.

12. The method according to claim 8,
wherein, if the determined identification key is a menu key for outputting a menu window, the second image is the menu window, and
wherein the controller acquires a remote controller model corresponding to a key code at a point of time if the menu window is displayed.

* * * * *